June 23, 1931.  F. G. FOLBERTH ET AL  1,811,829
HEATER ATTACHMENT FOR AUTOMOBILES
Original Filed Sept. 24, 1923
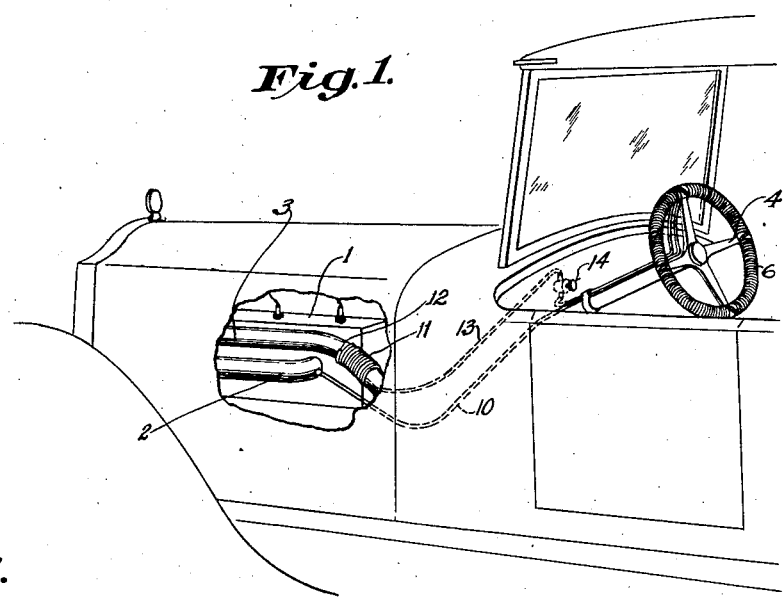
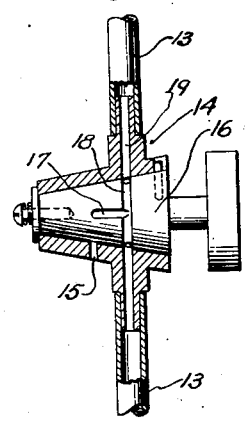
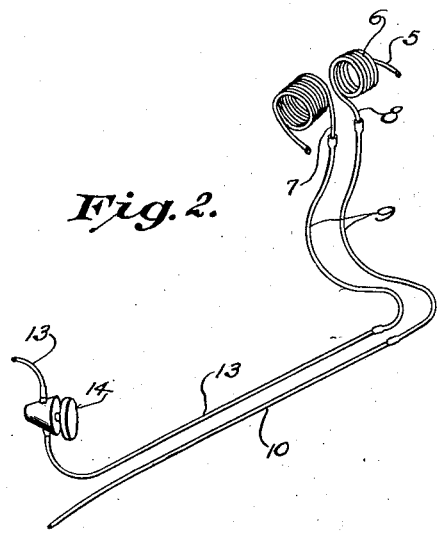
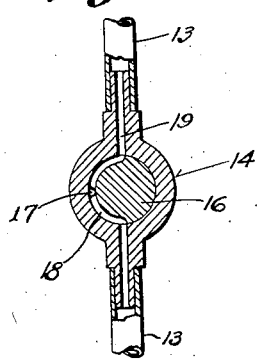
Inventors
Frederick G. Folberth
William M. Folberth
by Barton A. Bean
Atty.

Patented June 23, 1931

1,811,829

UNITED STATES PATENT OFFICE

FREDERICK G. FOLBERTH AND WILLIAM M. FOLBERTH, OF CLEVELAND, OHIO, ASSIGNORS TO TRICO PRODUCTS CORPORATION, OF BUFFALO, NEW YORK, A CORPORATION OF NEW YORK

HEATER ATTACHMENT FOR AUTOMOBILES

Original application filed September 24, 1923, Serial No. 664,618. Divided and this application filed June 21, 1927. Serial No. 200,469.

This invention relates to attachments for internal combustion engines and more particularly to an attachment for heating motor vehicles, this application being a division of our former application Serial No. 664,618 filed September 24, 1923.

Heretofore radiators have been devised for automobiles in which the exhaust gases or products of combustion have been diverted from the exhaust line through a heater installed within the passenger compartment of the motor vehicle and from which heater the exhaust gases have been returned to the exhaust line or permitted to escape at some other point into the outside atmosphere. This type of heater, while providing the requisite amount of warmth for the comfort of the passengers in the vehicle, has certain disadvantages which subject it to more or less severe criticism on the part of the motoring public. Among these disadvantages is this, that either from faulty construction or improper installation, it sometimes happens that the exhaust gases escape from the heater into the interior of the closed vehicle so that the lives and health of the passengers or occupants are endangered by the poisonous fumes contained within the exhaust gases.

An object of the present invention is to provide a safe, air-fluid heater for motor vehicles in which none of the products of combustion pass therethrough. A further object is to provide an air heater for motor vehicles through which is induced a current of warm or preheated air. Another object of the invention is to provide a heater in which the warm air passing through is initially preheated in a zone about the exhaust line, and after passing through the heater and dissipating a portion of its heat therein, is introduced into the combustible mixture flowing through the intake manifold of the motor vehicle engine. A still further object is to provide a heater or temperature regulator for motor vehicles with a selective control by which the heater may be caused to throw off heat or to produce a cooling effect.

In the drawings, showing one form of our invention,

Fig. 1 is a perspective view depicting a motor vehicle embodying a heater in the form of an attachment for the steering wheel for warming the hands of the operator of either a closed or open vehicle.

Fig. 2 is a fragmentary and more or less schematic showing of the heater and its control, which latter is preferably in the form of a valve mounted on the instrument board of a motor vehicle, Fig. 3 is a detailed view of the control valve partly in section and partly in elevation, Fig. 4 is a similar view showing the valve in the transverse section.

Referring more in detail to the accompanying drawings, the motor vehicle engine of the internal combustion type is indicated at 1 as having an intake manifold 2 and an exhaust manifold 3. In the form of the invention illustrated the heater is shown mounted on the steering wheel 4, although it obviously could be installed in the floor or at any other desirable point, depending upon the results desired. In adapting the heater to the steering wheel a metal tubing 5 is wound about the rim of the wheel, producing a heating or radiating coil 6, the coils being continuous about the periphery of the wheel and terminating at one end in an inlet nipple 7 and at the opposite end in an outlet nipple 8 to which nipples sections 9 of rubber tubing or the like are attached. Such flexible connections 9 permit the normal operation of the steering wheel without hindrance by reason of the heater or radiator attachment.

The outlet nipple 8 is connected by the respective tubing 9 and a further section, of preferably metal tubing 10, to the intake manifold, whereby during the normal operation of the invention a flow of air is induced through the coils and tubes 9 and 10 into the intake manifold. The air of this induced flow is preliminarily heated by a suitable heater such as the exhaust line 3. In the form of the invention shown a coiled section 11 of metal tubing is placed about the exhaust line 3, one terminal of the coil opening to the atmosphere, as indicated at 12, and the opposite end of the coil 11 being connected by a pipe or tube 13 to the flexible hose 9 which is joined to the inlet nipple 7. Consequently the induced flow of air will enter the heating zone 11 at the point 12 and after passing through the heating zone it will enter and pass through the heating coils 6 and finally enter the intake manifold. The heating coil 11 may be of more or less extended length so that the air in passing through the coil will be amply and fully heated for the efficient functioning of the heating coils 6.

Interposed in the line 13 is a control valve 14 whereby the rate of flow of the induced current may be practically controlled or entirely shut off. In the event that the heating coil 6 becomes heated too highly so that a quick cooling thereof is desired, or in the event that the operator wishes the benefit of a cool hand grip on the wheel in hot weather, the valve is provided with an air port 15 opening directly into the atmosphere. This port 15 may extend to a point exterior of the vehicle if desired and is so located that when the valve plug 16 is turned or rotated to bring its surface passage or duct 17 into communication with said port 15, the communication between the heating coil 6 and the heating zone 11 will have been completely interrupted and heating coil 6 will have been placed in direct communication with the cooling atmosphere, the warm air duct 18 of the valve having been turned out of registry with the warm air inlet port 19.

We claim as our invention:

1. In combination with a motor vehicle provided with a rimmed steering wheel and an internal combustion engine having an intake manifold and an exhaust manifold, a radiator comprising a tube coiled around the steering wheel rim and having one end connected to the intake manifold, whereby the suction within the latter will induce a flow of air from the radiator into the intake manifold, an air inlet conduit connected to the opposite end of the radiator and open to the atmosphere for admitting atmospheric air thereinto, said conduit being heated by the exhaust manifold whereby the inflowing air will be heated thereby and effect a warming of the radiator, and valve means for closing the conduit to the heat from the exhaust manifold and opening the conduit directly to the atmosphere whereby the radiator for the steering wheel may be cooled.

2. In a motor vehicle provided with a steering column and wheel, the latter having an outer rim, a radiator comprising a tube coiled around the rim and constituting a hand grip therefor, inflow and outflow pipes mounted upon the steering column for conducting heated air to and from said radiator, and flexible conduits connecting said pipes to said radiator.

3. In combination with a motor vehicle having an internal combustion engine provided with an intake pipe, a combined heating and cooling element mounted on the vehicle and connected to the intake pipe, an air inlet conduit for said element through which an inflow of air is induced by the suction within the intake pipe, means for heating the air flowing into the element through said inlet conduit, a passage for admitting unheated air to the element, and a valve for selectively connecting the inlet conduit and passage to said element.

FREDERICK G. FOLBERTH.
WILLIAM M. FOLBERTH.